Dec. 3, 1963 F. W. LEWIS 3,113,175
WELDED ELECTRICAL CONNECTION
Filed Nov. 1, 1961
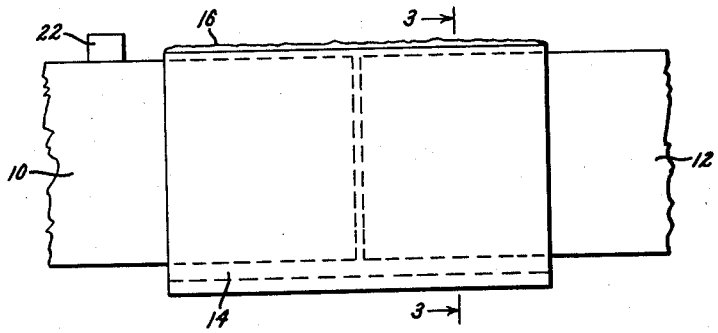
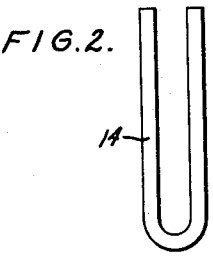
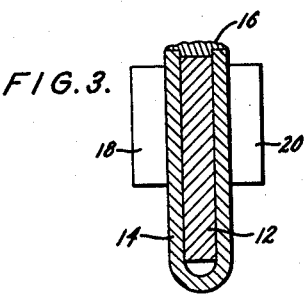
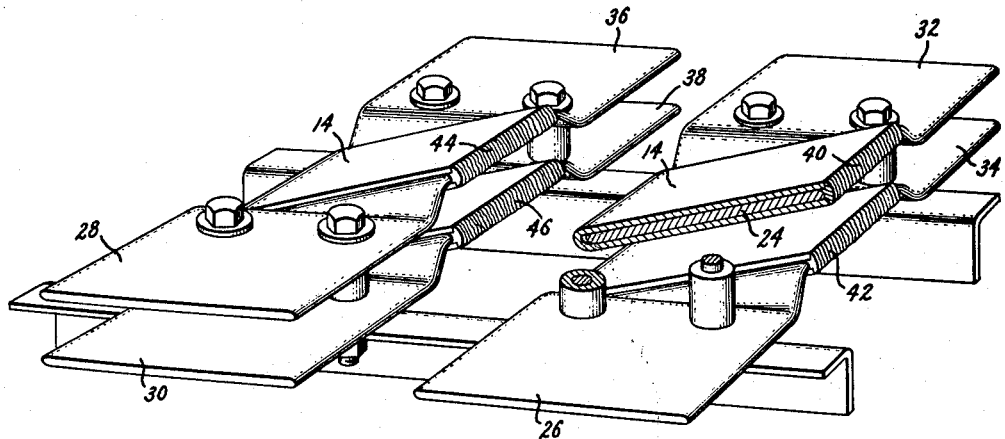
INVENTOR:
FRANKLIN W. LEWIS,
BY Albert S. Richardson Jr.
ATTORNEY.

United States Patent Office 3,113,175
Patented Dec. 3, 1963

3,113,175
WELDED ELECTRICAL CONNECTION
Franklin W. Lewis, Lansdowne, Pa., assignor to General Electric Company, a corporation of New York
Filed Nov. 1, 1961, Ser. No. 149,427
3 Claims. (Cl. 174—88)

This invention relates to electrical apparatus and more particularly to an electrical coupling between current carrying conductors or bus bars.

A fundamental requirement of most electrical apparatus is the provision for good electrical connections between conducting members, and this requirement is particularly important between bus bars in electric power switchgear and the like. Electrical connections between bus bars should provide good electrical contact to insure proper transmission with a minimum of power loss. Other desirable features of a connection between the bus bars are that it be inexpensive and easy to install. The ease of installation is particularly important when the connections are to be made in somewhat inaccessible positions or in apparatus in which space is limited. Additionally, good electrical connections between bus bars should be sufficiently rugged and reliable to withstand the various mechanical and electrical abuses to which the bars may be subjected.

Accordingly, it is a primary object of this invention to provide an improved electrical connection for bus bars or other conductors.

It is a further object of the invention to provide a welded bus bar connection that is inexpensive and provides a good electrical contact.

Another object of the invention is to provide an improved bus bar welded connection which may be formed between bus bars positioned in close proximity with other bus bars.

Briefly stated, the invention relates to a welded connection for joining two electroconductive members, with the end of one of the members to be joined having a U-shaped cross section and being adapted to embrace an overlapping end of the other member which has a rectangular cross section. An edge weld seam formed along the free edges of the U-shaped end of the one member and the adjacent edge of the other member securely joins these members and hence provides a good electrical and mechanical connection therebetween.

Further features, objects and advantages will become apparent with reference to the following drawings, in which:

FIG. 1 is a front elevation of a pair of bus bars connected by means of the welded connection of the invention;

FIG. 2 is an end view of the U-shaped splice member of the invention;

FIG. 3 is a cross-sectional view of the connection of FIG. 1; and

FIG. 4 is a perspective view, partly broken away, of a group of bus bars which have been joined by means of the improved connection of the invention.

Referring to FIG. 1, the electrical connection shown therein comprises, in accordance with a preferred embodiment of my invention, a means for securely joining a pair of bus bars such as those shown at 10 and 12. Although the bus bars 10 and 12 represent a pair of electrical conductors which may be found in any electrical apparatus, they may be considered, for purposes of illustration, as representing bus bars in electric power switchgear equipment or switchboards. The bus bars are joined by means of a U-shaped splice or clip member 14, which is shown positioned on the adjoining ends of the bus bars in FIG. 1 and is shown from an end view in FIG. 2. The bars may be made of any suitable material such as copper, and the splice 14 should preferably be made of the same material. The splice 14 is formed so that it presses firmly against the sides of the bus bars when installed to form a solid contact, and the legs of the splice extend a short distance beyond the upper edges of the bus bars.

After placing the splice 14 in position, an edge weld seam 16 of material corresponding to the bars and the splice 14 may be formed by any suitable means along the edges of the free ends of the splice and along the upper edges of the bus bars 10 and 12. The weld seam 16 forms a fused joint between each of the bus bars and the splice, thus the seam securely joins both bars to the splice which forms a good electrical connection between bars.

It has been found that in utilizing splices having relatively thin leg portions, it may be necessary to support the splice during the welding operation to prevent deformation and to form a good weld seam. For this purpose, supports or dams 18 and 20 made of suitable material such as carbon, may be positioned adjacent the outer walls of the splice legs. Another auxiliary feature which may be desirable when utilizing relatively thin splice members is the provision of a starting tab 22, which provides sufficient material to form a sound weld at the beginning of the joint.

It has been found that in forming the above described weld seam on bus bars made of copper or materials having similar properties, that it is desirable that the U-shaped electroconductive splice be vertically positioned with its open end extending upwardly. Consequently, in performing the welding operation by hand, it is possible that this be accomplished in a down-hand position.

An accessibility problem may be presented when forming welded joints for a plurality of bus bars spaced in close proximity, as might be found in an electrical substation. An example of such an arrangement and the means for solving the problem is illustrated by FIG. 4, wherein there is shown a plurality of flat bus bars 24, 26, 28 and 30 respectively welded to bus bars 32, 34, 36 and 38. It should be noted that instead of the orientation of bus bar shown, the bars might be positioned in generally vertical planes. As can be seen in FIG. 4, welded bus bar 24, 32 and welded bus bar 28, 36 are in edgewise alignment with each other, while welded bus bar 26, 34 is similarly disposed with respect to welded bus bar 30, 38. The welded joints 40, 42, 44 and 46 are those of the type heretofore described using the splice 14.

It has been found that when joining bus bars so arranged by means of the welded joint heretofore described in accordance with the invention, it is desirable to form the ends of the bus bars with a slight angular twist with respect to the adjacent bus bar body portions. Without the twists, bus bars 24, 32 and 26, 34 might interfere with the operator in manipulating the welding equipment with attempting to form the weld seam for joint 46. With the ends of the bus bars twisted to the slight angle with respect to the horizontal as shown in FIG. 4, and with the U-shaped splice members installed in the usual fashion, it has been found that a very satisfactory weld can be conveniently formed.

Thus it can be seen that the U-shaped splice and welded joint arrangement heretofore described is particularly adaptable for use with bus bars positioned in closely spaced aligned groups. With such confined arrangements, forming the bus bars with twisted ends ensures the accessiblity needed to perform the seam welding operation. In addition to not requiring a great amount of installation space, the joint itself is of course only slightly larger than the bus bars which it is connecting, as contrasted with joints utilizing bolts or similar bulky arrangements.

Consequently electrical clearance and insulation problems are relieved, and a more compact structure is possible.

It should be understood that the particular structure described is merely an example of the invention, and it will be obvious to those skilled in the art that various changes and modifications may be made without departing from the invention in its broader aspects. Therefore, it is intended in the appended claims to cover all such changes and modifications that fall within the true spirit and scope of the invention.

Having thus described the invention, what is claimed is:

1. In combination, a pair of bus bars positioned in end to end relation, an electrically conductive U-shaped splice placed over the opposing ends of the bus bars, said splice being in direct physical contact with said bus bars to provide an electrically conductive path therebetween and an edge weld seam formed along the free edges of the U-shaped splice and the adjacent edges of the bus bars to thereby join the bus bars.

2. A welded electrical connection comprising, a plurality of pairs of bus bars each bar having a substantially rectangular cross section, the bus bars in each of said pairs having adjacent end portions arranged to be mechanically and electrically joined, said pairs being arranged in parallel relation in a common plane and the end portion of each bar being angularly positioned with respect to the corresponding sides of the body of the respective bus bars, the end portions of said bus bars being positioned in end to end relation, a plurality of U-shaped splices, each of said splices being positioned to receive the adjacent end portions of bus bars in one of said pairs, and an edge weld seam formed along the free edges of each U-shaped splice and the adjacent edges of the end portions of the corresponding pair of bus bars.

3. In combination, a pair of elongated electroconductive members having interconnected ends disposed in overlapping relationship with each other, the end of one of said members having a U-shaped cross section, the overlapping end of the other member having a rectangular cross-section and being pressed tightly against an inner side of said U-shaped end, and an edge weld seam formed along the free edges of said U-shaped end and the adjacent edge of said rectangular end thereby securely to join and interconnect the ends of said members.

References Cited in the file of this patent
UNITED STATES PATENTS 1,707,317    Pipes _____ Apr. 2, 1929
2,062,886    Jensen _____ Dec. 1, 1936